United States Patent
Lee et al.

(10) Patent No.: US 9,021,013 B2
(45) Date of Patent: Apr. 28, 2015

(54) UBIQUITOUS WEB SERVICE GATEWAY AND METHOD

(75) Inventors: Kangchan Lee, Daejeon (KR); Seung Yun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 952 days.

(21) Appl. No.: 12/670,507

(22) PCT Filed: Jul. 31, 2008

(86) PCT No.: PCT/KR2008/004462
§ 371 (c)(1),
(2), (4) Date: Jan. 25, 2010

(87) PCT Pub. No.: WO2009/028805
PCT Pub. Date: Mar. 5, 2009

(65) Prior Publication Data
US 2010/0211631 A1   Aug. 19, 2010

(30) Foreign Application Priority Data
Aug. 30, 2007 (KR) .................. 10-2007-0087633

(51) Int. Cl.
*G06F 15/16* (2006.01)
*H04L 29/12* (2006.01)
*H04L 29/08* (2006.01)

(52) U.S. Cl.
CPC .... *H04L 29/12113* (2013.01); *H04L 29/12169* (2013.01); *H04L 61/1541* (2013.01); *H04L 61/1576* (2013.01); *H04L 67/16* (2013.01); *H04L 67/02* (2013.01)

(58) Field of Classification Search
CPC ............. H04L 29/12113; H04L 29/12169; H04L 67/02; H04L 67/16
USPC .............. 709/202–207, 219, 222, 231–234
See application file for complete search history.

(56) References Cited

U.S. PATENT DOCUMENTS 6,321,251 B1   11/2001  Deisinger et al.
2004/0221017 A1*  11/2004  Yoon ........................... 709/217
(Continued)

FOREIGN PATENT DOCUMENTS

JP    2003-152766    5/2003
JP    2005-99969     4/2005
(Continued)

OTHER PUBLICATIONS

International Search Report for PCT/KR2008/004462, mailed Jan. 16, 2009.

*Primary Examiner* — Philip B Tran
(74) *Attorney, Agent, or Firm* — Staas & Halsey LLP

(57) ABSTRACT

There is provided a method for providing ubiquitous web services including receiving, at a ubiquitous web service gateway, a request for web service from a web service requester, and sending, at the ubiquitous web service gateway, the request for web service to a web service provider dynamically selected from among web service providers that provide the requested web service, depending on a change in interface information of the web service providers. The method further includes receiving, at the ubiquitous web service gateway, the result of requested web service from the web service provider that received the request for web service, and providing, at the ubiquitous web service gateway, the web service result to the web service requester.

14 Claims, 4 Drawing Sheets

(56) References Cited

U.S. PATENT DOCUMENTS

| | | |
|---|---|---|
| 2005/0044197 A1* | 2/2005 | Lai .................................. 709/223 |
| 2005/0198206 A1* | 9/2005 | Miller et al. ................... 709/219 |
| 2006/0265720 A1* | 11/2006 | Cai et al. ....................... 719/330 |
| 2006/0285508 A1 | 12/2006 | Vermola et al. |
| 2007/0073769 A1* | 3/2007 | Baikov et al. .............. 707/104.1 |
| 2007/0266035 A1* | 11/2007 | Hays et al. ...................... 707/10 |

FOREIGN PATENT DOCUMENTS

| | | |
|---|---|---|
| KR | 10-2005-0060242 | 6/2005 |
| KR | 10-2006-0068553 | 6/2006 |
| WO | 2006/125705 A1 | 11/2006 |

* cited by examiner

UBIQUITOUS WEB SERVICE GATEWAY AND METHOD

CROSS-REFERENCE(S) TO RELATED APPLICATIONS

This application claims the benefit under 35 U.S.C. Section 371, of PCT International Application No. PCT/KR2008/004462, filed Jul. 31, 2008, which claimed priority to Korean Patent Application No. 10-2007-0087633, filed on Aug. 30, 2007, the disclosures of which are incorporated herein by reference.

TECHNICAL FIELD

The present invention relates to a web service method under network environment, and more particularly, to a ubiquitous web service gateway and method for extending an conventional web service structure so as to support dynamic binding between a web service provider and a web service requester under ubiquitous environment.

BACKGROUND ART

Generally, a ubiquitous service refers to a service that allows a user to receive a desired service in anywhere. Also, a ubiquitous web service is a technology that enables connection, combination, and use of various application services at any terminal and under any environment. Through such a ubiquitous web service, a web service provider and a web service requester can coexist in various ubiquitous environments, and if having only web service function any terminal can use the function of web service provider.

However, the conventional web service statically binds the web service provider and the web service requester. Therefore, if the web service provider side's information is changed, the web service requester side's information should also be changed accordingly. For example, in case a service provider provides a web service that provides an address upon receipt of a zip code, if its interface is modified, a web service requester that is using the service should be modified to be compiled again. Further, in case a service A cannot be used, although a service B provides the same service, the existing web service method can not recognize this and dynamically offer the service B substituting for service A to the web service requester.

Under the ubiquitous environment, more seamless and robust services should be provided compared to under the conventional computer environment, but the above-stated drawbacks have been a great obstacle to the ubiquitous environment.

FIG. 1 is a block diagram showing the configuration of a conventional web service system. Referring to FIG. 1, the conventional web service system includes a web service registry 100, a web service requester 110, and a web service provider 120.

The following is a description for the operation of the conventional web service system.

First of all, the web service provider 120 stores interface information, including WSDL (web service description language) files for services to be provided, in the web service registry 100 in step S15. And then, the web service requester 110 searches for a desired web service from the web service registry 100 and receives interface information required for using the desired web service in step S14.

Next, the web service requester 110 receives the desired web service from the web service provider 120 by using the interface information. At this time, message exchanges between web service requester 110, the web service registry 100 and the web service provider 120 are based on SOAP (simple object access protocol). Many communication message exchanges that are also based on SOAP are required between the web service requester 110 and the web service provider 120.

FIG. 2 illustrates a procedure in which the web service system shown in FIG. 1 provides web services.

Referring to FIG. 2, the web service provider 120 first stores WSDL files and metadata associated with its own services in the web service registry 100, and then the web service registry 100 notifies the web service provider 120 of the storage result upon storage request. Next, the web service requester 110 requests the web service registry 100 to search whether there is its desired web service therein, and the web service registry 100 provides the web service requester 110 with the search result.

Lastly, the web service requester 110 receives a web service in a manner that it requests a desired service by communication message exchanges with the web service provider 120 based on interface information of the web service provider 120 provided from the web service registry 100, and receives the result of web service requested to the web service provider 120.

DISCLOSURE OF INVENTION

Technical Problem

In the conventional web service, however, in case the information of a web service provider is changed, the information of a web service requester also needs to be changed due to static binding characteristics of web services, which makes it difficult to implement web services.

Technical Solution

It is, therefore, a primary object of the present invention to provide a ubiquitous web service gateway (USWG) and method, which allow a web service requester to dynamically utilize a web service provider in using web services under ubiquitous environment, that is, by a small-sized terminal as well as a general computer.

In accordance with one aspect of the invention, there is provided a method for providing ubiquitous web services including receiving, at a ubiquitous web service gateway, a request for web service from a web service requester, and sending, at the ubiquitous web service gateway, the request for web service to a web service provider dynamically selected from among web service providers that provide the requested web service, depending on a change in interface information of the web service providers. The method further includes receiving, at the ubiquitous web service gateway, the result of requested web service from the web service provider that received the request for web service, and providing, at the ubiquitous web service gateway, the web service result to the web service requester. The step of sending the request for web service includes searching for, at the ubiquitous web service gateway, a plurality of web service providers that provides the requested web service, selecting a particular web service provider corresponding to the web service requester's preference among the plurality of searched web service providers, and sending the request for web service from the web service requester to the selected web service provider. The step of sending the request for web service includes searching for, at the ubiquitous web service gateway, a particular web service provider corresponding to the requested web service, checking whether the requested web service can be performed by the searched web service provider, and when the web service cannot be provided, selecting another web service provider that can perform the requested web service by further searching. In the step of sending the request for web service includes, the ubiquitous web service gateway parses the request for web service to analyze what kind of web service is requested, searches for a web service provider that provides the web service, and sends the request for web service to the searched web service provider.

The request for web service is sent to the web service provider in the form of a serialized simple object access protocol message. In the step of sending the request for web service, the interface information of the web service provider is stored in an internal registry of the ubiquitous web service gateway. The interface information of the web service provider is stored in the ubiquitous web service gateway directly by the web service provider, or by an external web service registry having the interface information of the web service provider. The ubiquitous web service gateway parses the web service result and sends the result of parsing in the form of a serialized message to be delivered to the web service requester.

In accordance with another aspect of the invention, there is provided a ubiquitous web service gateway including a ubiquitous web service registry for receiving a web service description language file from a web service provider or a web service registry and storing a related information of the received file, a mapping table for storing information to call the web service provider, a web server adaptor for dynamically searching for a web service available under ubiquitous environment by using the information stored in the mapping table, and mapping a web service desired by a web service requester to the searched web service, and a message router for routing a web service request message from the web service requester to the web service provider. The ubiquitous web service gateway further includes a message processor for parsing the web service request message from the web service requester and transferring it to the ubiquitous web service registry, the mapping table, and the message router, and a result processor for processing a message to transfer a result of web service received from the web service provider to the web service requester. The ubiquitous environment is one of JINI, Havi, and UPnP. When a plurality of web service providers is called up, the result processor collects results from web service providers and transfers the same to the web service requester. The mapping table stores metadata including service names, addresses of web service providers, and service information.

Advantageous Effects

In accordance with the present invention, the problem that it is needed to change web service requester's information when web service provider's information is changed can be solved by using a ubiquitous web service gateway that dynamically connects a web service requester to a web service provider.

In addition, when the web service provider can not provide any service, it can be replaced by another service provider. In other words, by providing dynamic binding function under ubiquitous web service environment, more various web services can be utilized in ubiquitous web service environment.

BRIEF DESCRIPTION OF THE DRAWINGS

The above and other objects and features of the present invention will become apparent from the following description of embodiments, given in conjunction with the accompanying drawings, in which.

BEST MODE FOR CARRYING OUT THE INVENTION

Hereinafter, the operational principle of the present invention will be described in detail with reference to the accompanying drawings.

Figure 3:
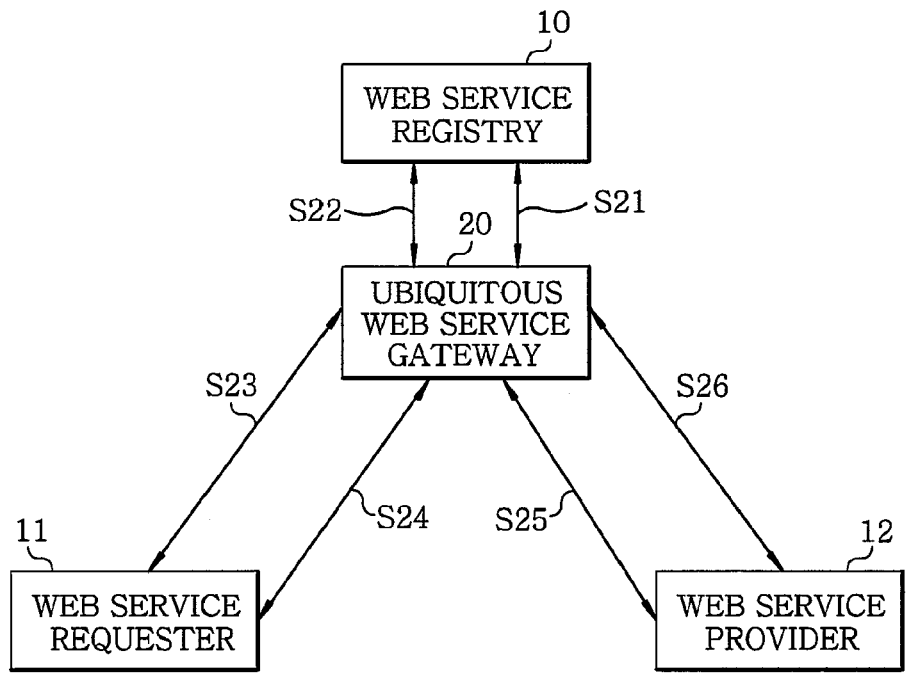
FIG. 3 illustrates a block diagram of a web service system in accordance with a preferred embodiment of the present invention.

FIG. 3 illustrates a block diagram of a web service system in accordance with a preferred embodiment of the present invention.

Figure 1:
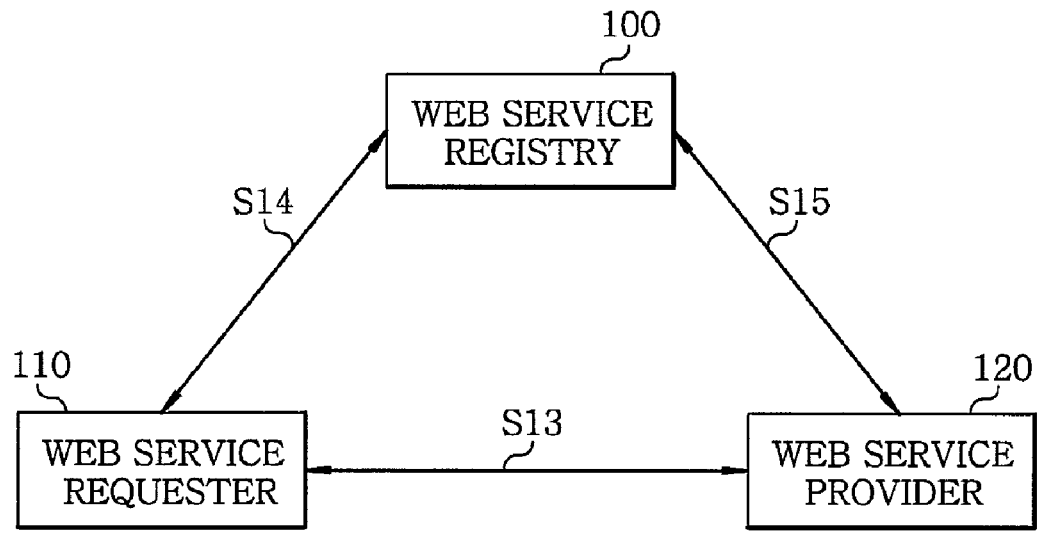
FIG. 1 is a block diagram showing the configuration of a conventional web service system.
Figure 2:
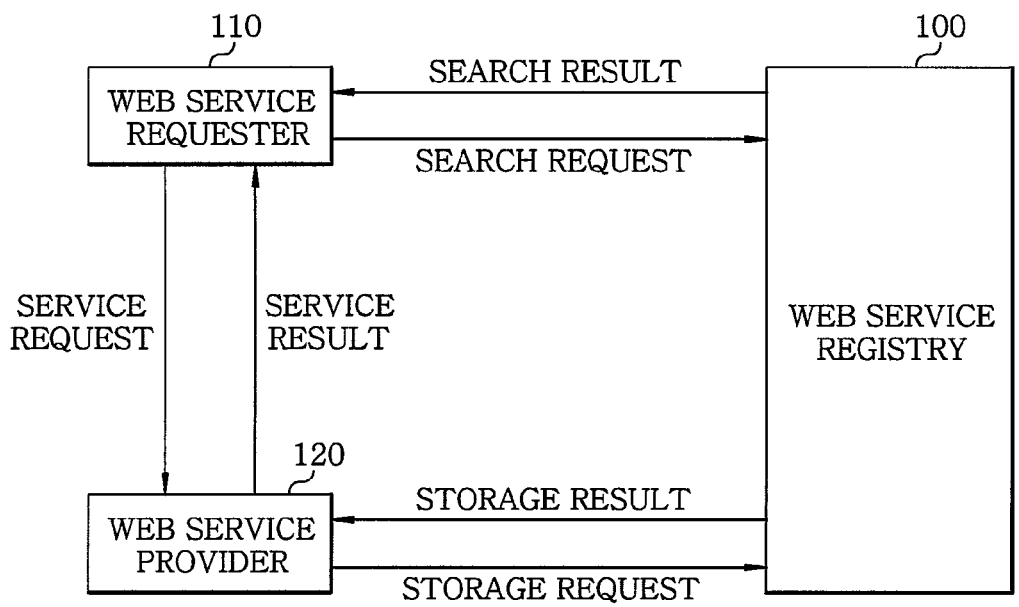
FIG. 2 provides a procedure in which the web service system shown in FIG. 1 provides web services.

Referring to FIG. 3, a web service requester 11, a web service provider 12, and a web service registry 10 are identical to the corresponding components of the conventional web service system shown in FIG. 1. A newly added component is a ubiquitous web service gateway 20 which is coupled between the web service requester 10 and the web service provider 12, and through which all interactions therebetween are passed.

The following is a detailed description for the operation of the ubiquitous web service gateway 20.

First, the web service provider 12 stores interface information, including WSDL files for web services to be provided, in the ubiquitous web service gateway 20 in step S26. Alternatively, the ubiquitous web service gateway 20 may store the interface information through the web service registry 10 in step S21. Also, the ubiquitous web service gateway 20 may search for desired services from the web service registry 10 and store them in step S22. And, a messages among all above-mentioned unit is in a form of Simple Object Access Protocol (SOAP).

Then, the web service requester 11 searches for a desired web service from the ubiquitous web service gateway 20 in step S23, to find out interface information of the web service provider 12 that provides the web service, and receives the desired service from the web service provider 12 by exchanging communication messages with the ubiquitous web service gateway 20 in steps S24 and S25.

Figure 4:
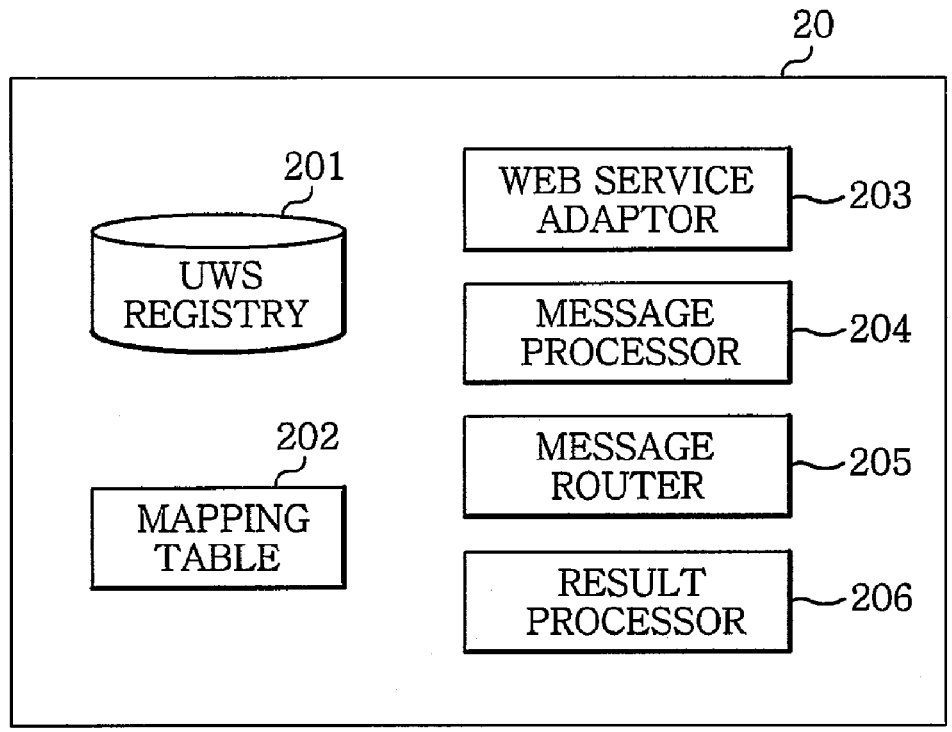
FIG. 4 presents a detailed block diagram of the ubiquitous web service gateway depicted in FIG. 3.

FIG. 4 shows a detailed block diagram of the ubiquitous web service gateway 20 shown in FIG. 3.

Now, the operation of each component of the ubiquitous web service gateway 20 will be described in more detail with reference to FIG. 4.

The ubiquitous web service gateway 20 carries out all works for dynamic bonding between the web service requester 11 and the web service provider 12. As shown in FIG. 4, the ubiquitous web service gateway 20 is constituted by a UWS (ubiquitous web service) registry 201, a mapping table 202, a web service adaptor 203, a message processor 204, a message router 205, and a result processor 206.

The UWS registry 201 performs the same role as a conventional web service registry 10. That is, it receives a WSDL file, for a service to be provided, from the web service provider 12 or the web service registry 10 through the ubiquitous web service gateway 20, and stores its related information.

The mapping table 202 stores a service name, a web service provider's address, service information, metadata, etc. in order to dynamically call the web service provider 12.

The web service adaptor 203 serves as an adaptor that dynamically finds a web service that can be provided to the web service requester 11 and exactly maps a web service desired by the service user under ubiquitous environments such as JINI, Havi, UPnP, etc.

The message processor 204 parses messages from the web service requester the 11 and deliveries them to the UWS registry 201, the mapping table 202, and the message router 205.

The message router 205 is a module that binds a service desired by the web service requester 11 and functions to route the message from the web service requester 11 to the web service provider 12 suitable for the web service.

The result processor 206 performs a procedure of delivering the result of the web service provider 12 to the web service requester 11. If the ubiquitous web service gateway 20 calls a plurality of web service providers 12 in order to provide a web service, the result processor 206 collects and processes results from the web service providers 12.

Figure 5:
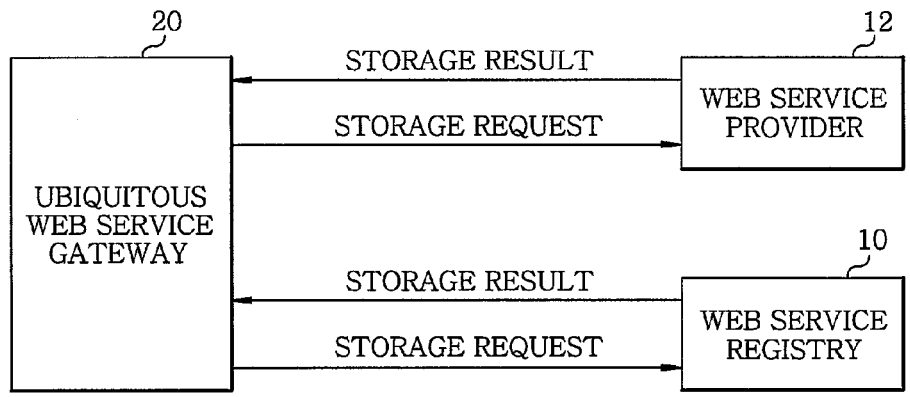
FIG. 5 shows a procedure in which WSDL files and metadata are stored in the ubiquitous web service gateway shown in FIG. 3.

FIG. 5 shows a procedure in which WSDL files and metadata are stored in the ubiquitous web service gateway 20 depicted in FIG. 3.

As shown in FIG. 5, there are two ways of storing service related information in the ubiquitous web service gateway 20. The first way is a way that service related information is directly stored in the ubiquitous web service gateway 20 from the web service provider 12 and the second way is a way that service related information is stored from the web service registry 10 in the ubiquitous web service gateway 20

More specifically, in the first way, the web service provider 12 requests the ubiquitous web service gateway 20 to store a WSDL file and metadata, and in response to this, the ubiquitous web service gateway 20 provides the result of storage request to the web service provider 12.

In the second way, the web service registry 10 requests the ubiquitous web service gateway 20 to store a WSDL file and metadata associated with the web service provider 12, and in response to this, the ubiquitous web service gateway 20 provides the result of storage request to the web service registry 10.

Figure 6:
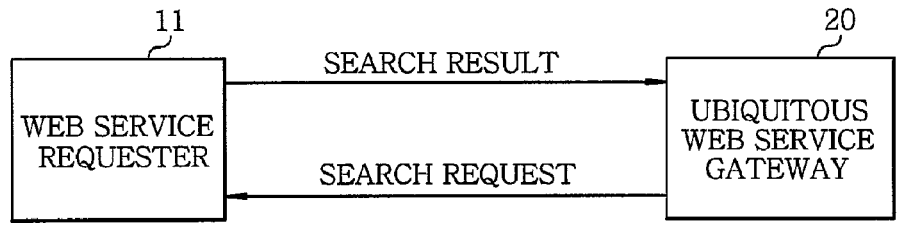
FIG. 6 offers a procedure in which the web service requester shown in FIG. 3 searches for services through the ubiquitous web service gateway.
Figure 7:
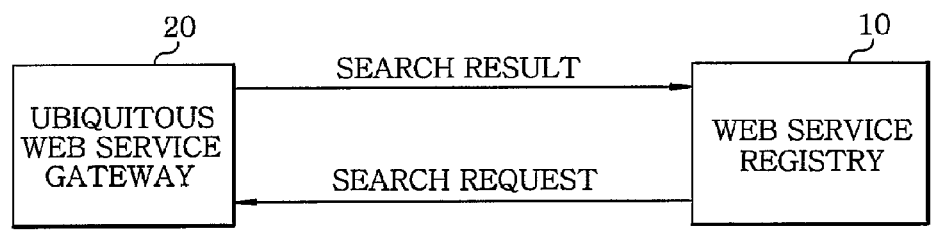
FIG. 7 shows a procedure in which the ubiquitous web service gateway shown in FIG. 3 searches for services through the web service registry.
Figure 8:
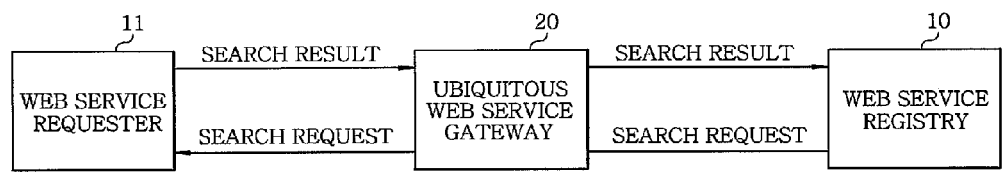
FIG. 8 is a diagram showing the search procedures of FIGS. 6 and 7 together.

FIGS. 6 to 8 describe procedures of searching for services in order that the web service requester 11 requests the web service provider 12 to provide services in accordance with the present invention.

Referring to FIG. 6, the web service requester 11 requests the ubiquitous web service gateway 20 to search for a desired web service. Then, the ubiquitous web service gateway 20 searches for the desired web service from services stored in the UWS registry 201, and forwards the result to the web service requester 11. If a plurality of web service providers are searched, the ubiquitous can select a particular web service provider corresponding to the web service requester's preference among the plurality of searched web service providers.

If there is no desired service in the UWS registry 201, the ubiquitous web service gateway 20 executes a dynamic search operation. The dynamic search operation is a series of processes that search the web service registry 10 and find a service suitable for the web service requested by the web service requester 11, as shown in FIG. 7.

That is, as in FIG. 6, the web service requester 11 requests the ubiquitous web service gateway 20 to search for a desired web service, and the ubiquitous web service gateway 20 provides the result of service search in response to the request.

However, if there is no suitable service, the ubiquitous web service gateway 20 again requests the web service registry 10 to search for the service requested by the web service requester 11, as shown in FIG. 7. Then, in response to the search request, the web service registry 10 provides the search result to the ubiquitous web service gateway 20.

The operational relationship between the web service requester 11 and the ubiquitous web service gateway 20 and the web service registry 10 described above is shown in FIG. 8.

Figure 9:
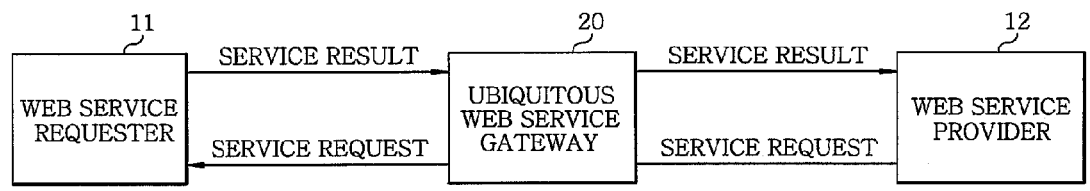
FIG. 9 illustrates a procedure in which the web service requester shown in FIG. 3 receives services from the web service provider through the ubiquitous web service gateway.

FIG. 9 describes a procedure in which a communication message are exchanged between the web service requester 12 and the web service provider 12 through the ubiquitous web service gateway 20 in accordance with the present invention.

Referring to FIG. 9, when the web service requester 11 requests the ubiquitous web service gateway 20 to provide a desired service, the ubiquitous web service gateway 20 provides the search result responding to the requests of the web service requester 11.

To be more specific, when the message processor 204 of the ubiquitous web service gateway 20 shown in FIG. 4 receives a communication message for a request for web service from the web service requester 11, it analyzes what kind of service is requested by parsing and finds the service from the mapping table 202. Next, the message processor 204 transmits a service request message serialized in the form of SOAP message to the web service provider 12 through the message router 205. Then, the web service provider 12 provides the result of requested service to the ubiquitous web service gateway 20.

The result processor 206 of the ubiquitous web service gateway 20 that receives the service result from the web service provider 12 parses this and finally serializes it in the form of message to be delivered to the web service requester 11, followed by delivering the same to the web service requester 11 through the message router 205.

In accordance with the present invention, the problem that it is needed to change web service requester's information when web service provider's information is changed can be solved by using a ubiquitous web service gateway that dynamically connects a web service requester to a web service provider.

In addition, when the web service provider can not provide any service, it can be replaced by another service provider. In other words, by providing dynamic binding function under ubiquitous web service environment, more various web services can be utilized in ubiquitous web service environment.

While the invention has been shown and described with respect to the embodiments, it will be understood by those skilled in the art that various changes and modification may be made without departing from scope of the invention as defined in the following claims.

The invention claimed is:

1. A method for providing ubiquitous web services, comprising:
    receiving, at a ubiquitous web service gateway, a request for web service from a web service requester; and
    sending, at the ubiquitous web service gateway, the request for web service to a web service provider dynamically selected from among web service providers that provide the requested web service, depending on a change in interface information, including WSDL files for web services to be provided, of the web service providers,
    wherein the web service provider is dynamically connected to the web service requester to replace the web service provider as another one when the web service is not provided by the web service provider.

2. The method of claim 1, further comprising:
    receiving, at the ubiquitous web service gateway, the result of requested web service from the web service provider that received the request for web service; and
    providing, at the ubiquitous web service gateway, the web service result to the web service requester.

3. The method of claim 2, wherein, in the providing the web service result, the ubiquitous web service gateway parses the web service result and sends the result of parsing in the form of a serialized message to be delivered to the web service requester.

4. The method of claim 1, wherein the sending the request includes:
    searching for, at the ubiquitous web service gateway, a plurality of web service providers that provides the requested web service;
    selecting a particular web service provider corresponding to the web service requester's preference among the plurality of searched web service providers; and
    sending the request for web service from the web service requester to the selected web service provider.

5. The method of claim 1, wherein the sending the request includes:
    searching for, at the ubiquitous web service gateway, a particular web service provider corresponding to the requested web service;
    checking whether the requested web service can be performed by the searched web service provider; and
    when the web service cannot be provided, selecting another web service provider that can perform the requested web service by further searching.

6. The method of claim 1, wherein in the sending the request, the ubiquitous web service gateway parses the request for web service to analyze what kind of web service is requested, searches for a web service provider that provides the web service, and sends the request for web service to the searched web service provider.

7. The method of claim 6, wherein the request for web service is sent to the web service provider in the form of a serialized simple object access protocol message.

8. The method of claim 1, wherein, in the sending the request, the interface information of the web service provider is stored in an internal registry of the ubiquitous web service gateway.

9. The method of claim 8, wherein the interface information of the web service provider is stored in the ubiquitous web service gateway directly by the web service provider, or by an external web service registry having the interface information of the web service provider.

10. A ubiquitous web service gateway, comprising:
    a ubiquitous web service registry to receive interface information comprising a web service description language file from a web service provider or a web service registry, depending on a change in the interface information, including WSDL files for web services to be provided, and to store the interface information of the received file;
    a storage to store information in a form of a mapping table to call the web service provider;
    a web server adaptor to dynamically search for a web service available under ubiquitous environment by using the information stored in the form of mapping table, and to map a web service desired by a web service requester to the searched web service; and
    a message router to route a web service request message from the web service requester to the web service provider,
    wherein the web service provider is dynamically connected to the web service requester to replace the web service provider as another one when the web service is not provided by the web service provider.

11. The ubiquitous web service gateway of claim 10, further comprising:
    a message processor to parse the web service request message from the web service requester and to transfer the web service request message to the ubiquitous web service registry, the mapping table, and the message router; and
    a result processor to process a message to transfer a result of web service received from the web service provider to the web service requester.

12. The ubiquitous web service gateway of claim 11, wherein, when a plurality of web service providers is called up, the result processor collects results from web service providers and transfers the same to the web service requester.

13. The ubiquitous web service gateway of claim 10, wherein the ubiquitous environment is one of JINI, Havi, and UPnP.

14. The ubiquitous web service gateway of claim 10, wherein the mapping table stores metadata including service names, addresses of web service providers, and service information.

* * * * *